US010473057B2

(12) United States Patent
Aten

(10) Patent No.: US 10,473,057 B2
(45) Date of Patent: Nov. 12, 2019

(54) THRUST REVERSER SYSTEM WITH TRANSLATING ELEMENTS

(71) Applicant: Rohr, Inc., Chula Vista, CA (US)

(72) Inventor: Michael Aten, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 871 days.

(21) Appl. No.: 14/968,357

(22) Filed: Dec. 14, 2015

(65) Prior Publication Data
US 2017/0167440 A1 Jun. 15, 2017

(51) Int. Cl.
*F02K 1/76* (2006.01)
*B64D 33/04* (2006.01)
*F02K 1/56* (2006.01)
*F16H 25/20* (2006.01)
*F02K 1/72* (2006.01)

(52) U.S. Cl.
CPC .............. *F02K 1/763* (2013.01); *B64D 33/04* (2013.01); *F02K 1/56* (2013.01); *F16H 25/20* (2013.01); *F02K 1/72* (2013.01); *F05D 2220/323* (2013.01); *F05D 2260/50* (2013.01); *F16H 2025/2059* (2013.01); *F16H 2025/2075* (2013.01)

(58) Field of Classification Search
CPC . F02K 1/763; F02K 1/76; F02K 1/766; F02K 1/72; F02K 1/566; F02K 1/605; F02K 1/625; F02K 1/64; F02K 1/56–70; B64D 33/04; F05D 2260/50; F05D 2260/57; F16H 2025/0259; F16H 2025/2075; F16H 25/20
See application file for complete search history.

(56) References Cited

U.S. PATENT DOCUMENTS

| | | |
|---|---|---|
| 3,511,055 A | 5/1970 | Timms |
| 3,621,763 A | 11/1971 | Geyer |
| 3,829,020 A | 8/1974 | Stearns |
| 4,278,220 A | 7/1981 | Johnston |
| 4,519,561 A | 5/1985 | Timms |
| 4,564,160 A | 1/1986 | Vermilye |
| 4,807,434 A | 2/1989 | Jurich |
| 4,909,442 A | 3/1990 | Fernz |
| 5,144,851 A | 9/1992 | Grimm et al. |
| 5,228,641 A | 7/1993 | Remlaoui |
| 5,309,711 A | 5/1994 | Matthias |

(Continued)

FOREIGN PATENT DOCUMENTS

EP 0801221 10/1997
WO WO2009122026 A1 10/2009

OTHER PUBLICATIONS

EP search report for EP16203790.7 dated Sep. 5, 2017.
SKYbrary, "Cascade Reverser", from SKYbrary Wiki, Dec. 9, 2013.

*Primary Examiner* — Jason H Duger
(74) *Attorney, Agent, or Firm* — O'Shea Getz P.C.

(57) ABSTRACT

A thrust reverser system is provided with an axial centerline. This thrust reverser system includes a first translating element, a second translating element and an actuator mechanism. The actuator mechanism is attached to the first translating element and the second translating element. The actuator mechanism is configured to translate the first translating element along the axial centerline at a first rate. The actuator mechanism is configured to translate the second translating element along the axial centerline at a second rate, which may be different than the first rate.

9 Claims, 7 Drawing Sheets

(56) References Cited

U.S. PATENT DOCUMENTS

| | | | |
|---|---|---|---|
| 5,927,647 A | 7/1999 | Masters | |
| 6,036,238 A | 3/2000 | Lallament | |
| 6,167,694 B1 | 1/2001 | Davies | |
| 6,170,254 B1 | 1/2001 | Cariola | |
| 6,340,135 B1 | 1/2002 | Barton | |
| 6,434,927 B1 * | 8/2002 | Stretton | F02K 1/72 239/265.31 |
| 6,584,763 B2 | 7/2003 | Lymons | |
| 6,845,946 B2 | 1/2005 | Lair | |
| 6,895,742 B2 | 5/2005 | Lair | |
| 7,146,796 B2 | 12/2006 | Lair | |
| 7,264,203 B2 | 9/2007 | Lair | |
| 7,513,101 B2 | 4/2009 | Eschborn | |
| 8,109,466 B2 | 2/2012 | Aten | |
| 8,615,982 B2 | 12/2013 | Sundstrom | |
| 8,869,507 B2 * | 10/2014 | Cloft | F02K 1/68 239/265.27 |
| 2010/0192715 A1 | 8/2010 | Vauchel et al. | |
| 2010/0205931 A1 | 8/2010 | Baudu et al. | |
| 2010/0270428 A1 | 10/2010 | Murphy | |
| 2011/0062279 A1 | 3/2011 | Welch | |
| 2011/0167790 A1 | 7/2011 | Cloft | |
| 2012/0067975 A1 | 3/2012 | Vauchel | |
| 2012/0187214 A1 | 7/2012 | Welch | |
| 2013/0075492 A1 | 3/2013 | Welch | |
| 2013/0160425 A1 | 6/2013 | Scanlon | |
| 2013/0186219 A1 | 7/2013 | Jones | |
| 2013/0284822 A1 | 10/2013 | Howarth | |

\* cited by examiner

THRUST REVERSER SYSTEM WITH TRANSLATING ELEMENTS

BACKGROUND OF THE INVENTION

1. Technical Field

This disclosure relates generally to an aircraft propulsion system and, more particularly, to a thrust reverser system for an aircraft propulsion system.

2. Background Information

A propulsion system for an aircraft may include a thrust reverser system for providing reverse thrust. Various types and configurations of thrust reverser systems are known in the art. While these thrust reverser systems have various advantages, there is still a need in the art for an improved thrust reverser actuation system for an aircraft propulsion system.

SUMMARY OF THE DISCLOSURE

According to an aspect of the present disclosure, a thrust reverser system is provided with an axial centerline. This thrust reverser system includes a first translating element, a second translating element and an actuator mechanism. The actuator mechanism is attached to the first translating element and the second translating element. The actuator mechanism is configured to translate the first translating element substantially along the axial centerline at a first rate. The actuator mechanism is configured to translate the second translating element substantially along the axial centerline at a second rate that is different than the first rate.

According to an aspect of the present disclosure, a thrust reverser system is provided with an axial centerline. This thrust reverser system includes a fixed structure, a first translating element, a second translating element and an actuator mechanism. The actuator mechanism is mounted to the fixed structure and includes a first drive component and a second drive component. The first drive component is mounted to the first translating element independent of the second translating element. The second drive component is mounted to the second translating element independent of the first translating element. The actuator mechanism is configured to axially translate the first translating element and the second translating element.

The actuator mechanism may be configured to translate the first translating element along the axial centerline at a first rate. The actuator mechanism may be configured to translate the second translating element along the axial centerline at a second rate that is different than the first rate.

The first rate may be faster than the second rate. Alternatively, the second rate may be faster than the first rate.

The first translating element may include or be configured as a translating cascade. In addition or alternatively, the second translating element may include or be configured as a translating sleeve.

The actuator mechanism may include a drive mechanism and an actuator configured to actuate the drive mechanism. The drive mechanism may include the first drive component and the second drive component.

The drive mechanism may include a lead screw sleeve, a lead screw shaft and a shuttle nut. The lead screw sleeve may couple the actuator with the lead screw shaft and the shuttle nut. The lead screw shaft may be within the lead screw sleeve and may be mated with the lead screw sleeve by a threaded interface. The lead screw shaft may include or be configured as the first drive component. The shuttle nut may circumscribe the lead screw sleeve and may be mated with the lead screw sleeve by a threaded interface. The shuttle nut may include or be configured as the second drive component.

The drive mechanism may include a lead screw sleeve, a lead screw shaft and a shuttle nut. The lead screw sleeve may couple the actuator with the lead screw shaft and the shuttle nut. The lead screw shaft may be within the lead screw sleeve and may be mated with the lead screw sleeve by a threaded interface. The lead screw shaft may include or be configured as the second drive component. The shuttle nut may circumscribe the lead screw sleeve and may be mated with the lead screw sleeve by a threaded interface. The shuttle nut may include or be configured as the first drive component.

The actuator mechanism may include a drive mechanism and an actuator configured to actuate the drive mechanism. The drive mechanism may include a first drive component connected to the second translating element and a second drive component connected to the first translating element.

The drive mechanism may be configured as or include a lead screw mechanism.

The drive mechanism may include a lead screw sleeve, a lead screw shaft and a shuttle nut. The lead screw sleeve may couple the actuator with the lead screw shaft and the shuttle nut. The lead screw shaft may be within the lead screw sleeve and may be mated with the lead screw sleeve by a first threaded interface. The shuttle nut may circumscribe the lead screw sleeve and may be mated with the lead screw sleeve by a second threaded interface.

The lead screw shaft may be configured as or include the first drive component. The shuttle nut may be configured as or include the second drive component.

The first threaded interface may have a coarser pitch than the second threaded interface. Alternatively, the first threaded interface may have a finer pitch than the second threaded interface.

The actuator mechanism may be configured to translate the translating sleeve between a stowed position and a deployed position. The translating sleeve may cover an axial portion of the translating cascade in the stowed position. The translating sleeve may at least partially uncover the axial portion of the translating cascade in the deployed position.

A fixed structure may be included. The actuator mechanism may be mounted to the fixed structure and may be configured to translate the translating cascade between a stowed position and a deployed position. The fixed structure may cover an axial portion of the translating cascade in the stowed position. The fixed structure may at least partially uncover the axial portion of the translating cascade in the deployed position.

The foregoing features and the operation of the invention will become more apparent n light of the following description and the accompanying drawings.

DETAILED DESCRIPTION

Figure 1:
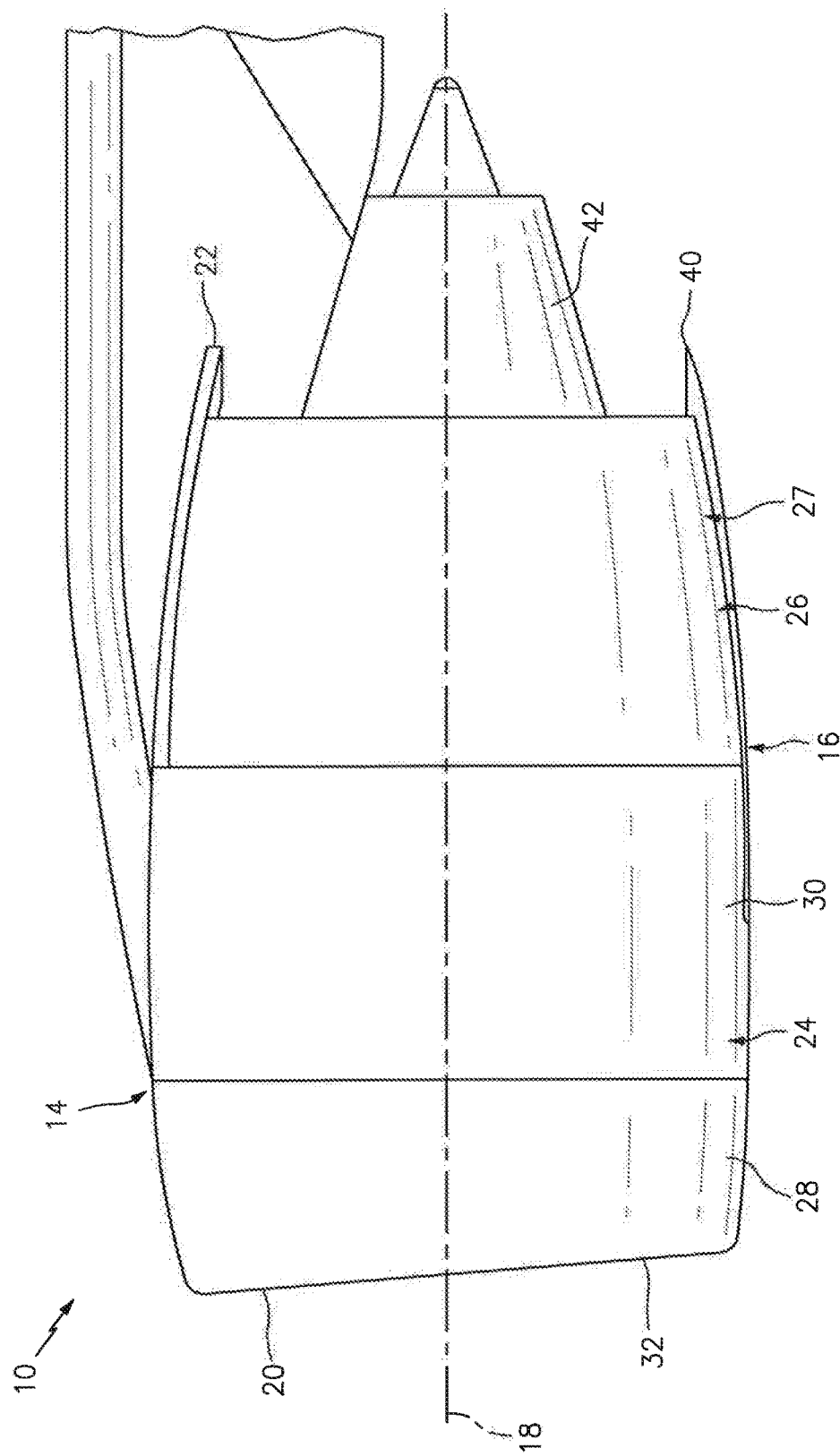
FIG. 1 is a side illustration of an aircraft propulsion system.
Figure 2:
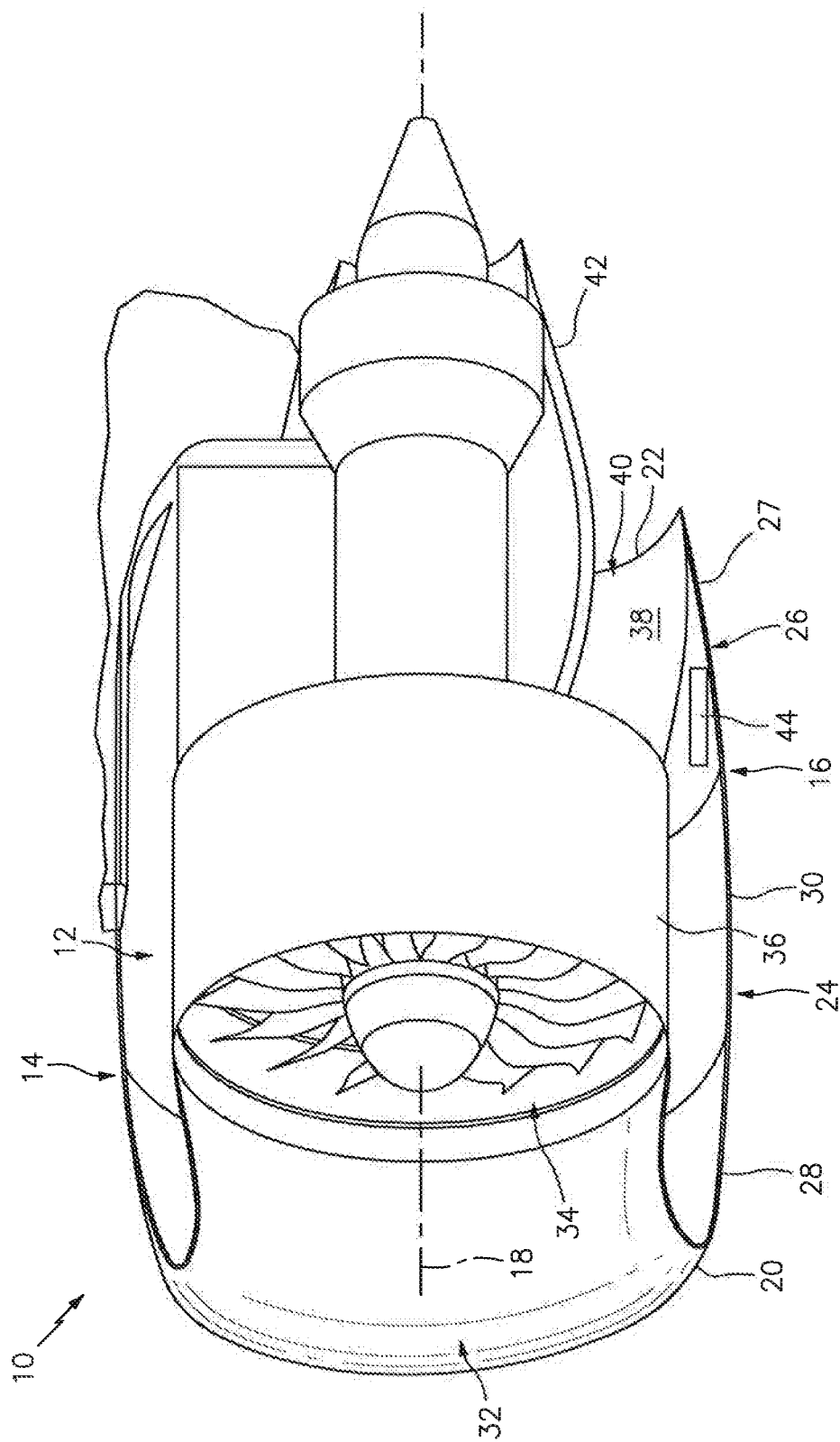
FIG. 2 is a side cutaway illustration of the aircraft propulsion system.

FIGS. 1 and 2 illustrate an aircraft propulsion system 10 for an aircraft such as a commercial airliner. This propulsion system 10 includes a gas turbine engine 12 configured as a turbofan engine and a nacelle 14, which circumscribes and provides an aerodynamic covering for the gas turbine engine 12 and helps to define the fan air flow path. The propulsion system 10 also includes a thrust reverser system 16 configured with the nacelle 14.

The nacelle 14 extends along an axial centerline 18 between a forward nacelle end 20 and an aft nacelle end 22. The nacelle 14 includes a forward nacelle structure 24 and an aft nacelle structure 26.

The forward nacelle structure 24 may include a nacelle inlet 28 and a fan cowling 30. The nacelle inlet 28 is disposed at the forward nacelle end 20. The nacelle inlet 28 is configured to direct a stream of air through an inlet orifice 32 and into the gas turbine engine 12. The fan cowling 30 is disposed axially between the nacelle inlet 28 and the aft nacelle structure 26, This fan cowling 30 may be generally axially aligned with a fan section 34 of the gas turbine engine 12, and configured to provide an aerodynamic covering for a fan case 36 which circumscribes the fan section 34.

The aft nacelle structure 26 is disposed at the aft nacelle end 22. The aft nacelle structure 26 of FIGS. 1 and 2 is configured as a thrust reverser and includes a translating sleeve 27, and may be generally referred to as a translating element. The aft nacelle structure 26 may also include other components such as, but not limited to, blocker doors, etc. The translating sleeve 27 provides an outer boundary for an axial portion of a bypass gas path 38, which extends through the propulsion system 10 to a bypass gas path exhaust nozzle 40. The translating sleeve 27 may also form the fan air exhaust nozzle 40 with an inner fairing assembly 42 (e.g., an inner fixed structure), which houses a core of the engine 12.

The translating sleeve 27 may have a substantially tubular unitary sleeve body (e.g., may extend more than 330 degrees around the centerline 18) as generally illustrated in FIG. 2. Alternatively, the translating sleeve 27 may include a pair of sleeve segments (e.g., halves) arranged on opposing sides of the propulsion system 10 as illustrated in FIG. 1. The present disclosure, however, is not limited to the foregoing exemplary translating sleeve configurations.

Figure 3:
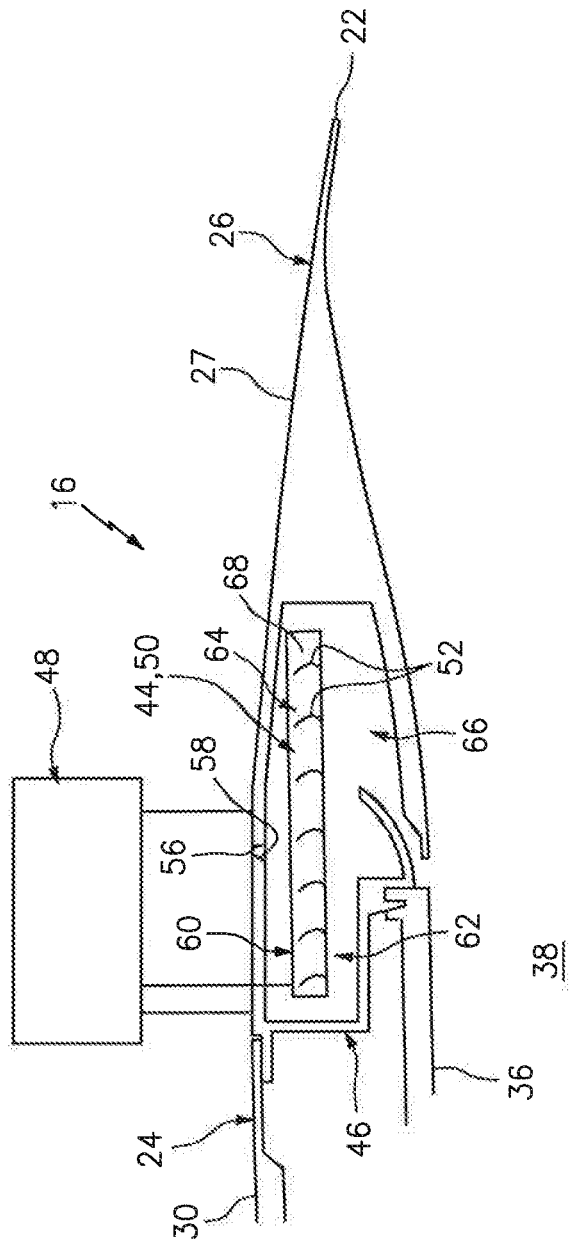
FIG. 3 is a side sectional illustration of a portion of an engine nacelle with a translating cascade and a translating sleeve in a stowed position, where the cascade and the sleeve are configured with an actuator mechanism shown in block diagram form.
Figure 4:
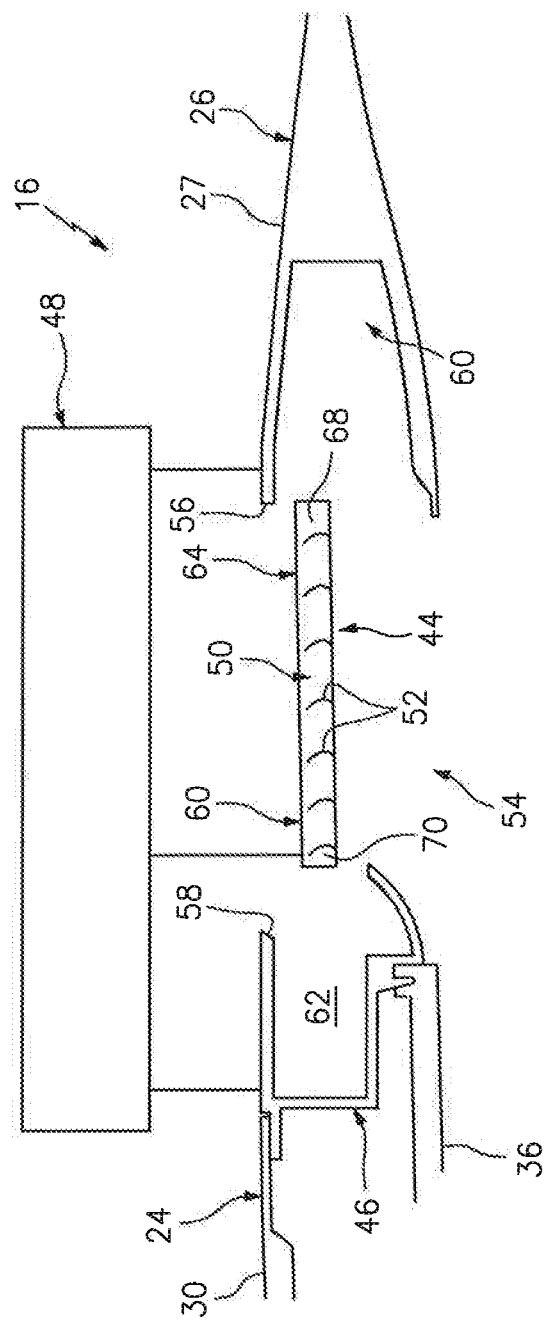
FIG. 4 is another side sectional illustration of the engine nacelle with the translating cascade and the translating sleeve in a deployed position, where the cascade and the sleeve are configured with the actuator mechanism shown in block diagram form.

Referring to FIGS. 3 and 4, the thrust reverser system 16 includes the translating sleeve 27, a translating cascade 44, a fixed structure 46 and one or more actuator mechanisms 48 (one shown), which mechanisms 48 may be arranged at discrete circumferential locations about the centerline 18. The thrust reverser system. 16 may also include one or more blocker doors and one or more linkages for moving the blocker doors. The blocker doors and the linkages, however, are not shown in FIGS. 3 and 4 for ease of illustration.

The translating cascade 44 may be generally referred to as a translating cascade. The translating cascade 44 may include one or more arrays 50 (one shown) of turning vanes 52, which arrays 50 may be arranged at discrete circumferential locations about the centerline 18. The turning vanes 52 in each of the thrust reverser arrays 50 are arranged in a plurality of parallel rows generally axially along the centerline 18. These turning vanes 52 are configured to redirect air flow through the translating cascade 44 in a generally outward and/or forward direction. Each of the turning vanes 52, for example, may have a generally cup-shaped (e.g., u-shaped) cross-sectional geometry as shown in FIGS. 3 and 4.

The translating cascade 44 may include a pair of cascade segments (e.g., halves) arranged on opposing sides of the propulsion system 10. The translating cascade 44 of the present disclosure, however, is not limited to the foregoing exemplary configuration. In other embodiments, for example, the translating cascade 44 may include a plurality of cascade segments on one or both sides of the propulsion system 10. In still other embodiments, the translating sleeve 27 may be configured as a single, unitary body.

The fixed structure 46 may be configured as part of the thrust reverser system 16. The fixed structure 46, for example, may be configured as an intermediate support structure such as a thrust reverser torque box. This fixed structure 46 is radially positioned generally between the fan case 36 and the fan cowling 30, and may engage the fan case 36 to support the thrust reverser 16.

The actuator mechanisms 48 are mounted to the fixed structure 46, These actuator mechanisms 48 are configured to translate the translating sleeve 27 along the centerline 18 between a stowed position (see FIG. 3) and a deployed position (see FIG. 4). The actuator mechanisms 48 are also configured to translate the translating cascade 44 along the centerline 18 between a stowed position (see FIG. 3) and a deployed position (see FIG. 4).

In the stowed position of FIG. 3, the translating sleeve 27 closes a passage 54 (see FIG. 4) through the nacelle 14 and the translating cascade 44. In particular, a forward end 56 of the translating sleeve 27 is positioned next to an aft end 58 of the fixed structure 46 and/or the fan cowling 30. A forward portion 60 of the translating cascade 44 projects axially into a channel 62 in the fixed structure 46, which channel 62 extends axially—in the forward direction—into the fixed structure 46 from its aft end 58. The fixed structure 46 thereby axially covers the forward portion 60 of the translating cascade 44. An aft portion 64 of the translating cascade 44 projects into a channel 66 in the translating sleeve 27, which channel 66 extends axially—in the aft direction—into the translating sleeve 27 from its forward end 56. The translating sleeve 27 thereby axially covers the aft portion 64 of the translating cascade 44.

In the deployed portion of FIG. 4, the translating sleeve 27 opens the passage 54 through the nacelle 14 and the translating cascade 44. In particular, the forward end 56 of the translating sleeve 27 is positioned approximately at (e.g., on, adjacent or proximate) an aft end 68 of turning vane arrays 50, which define turning channels through the translating cascade 44. The translating sleeve 27 thereby at least partially axially uncovers and exposes the aft portion 64 of the translating cascade 44. A forward end 70 of the turning vane arrays 50 is positioned approximately at the aft end 58 of the fixed structure 46 and/or the fan cowling 30. The fixed structure 46 and/or the fan cowling 30 thereby at least partially axially uncover and expose the forward portion 60 of the translating cascade 44.

Figure 5:
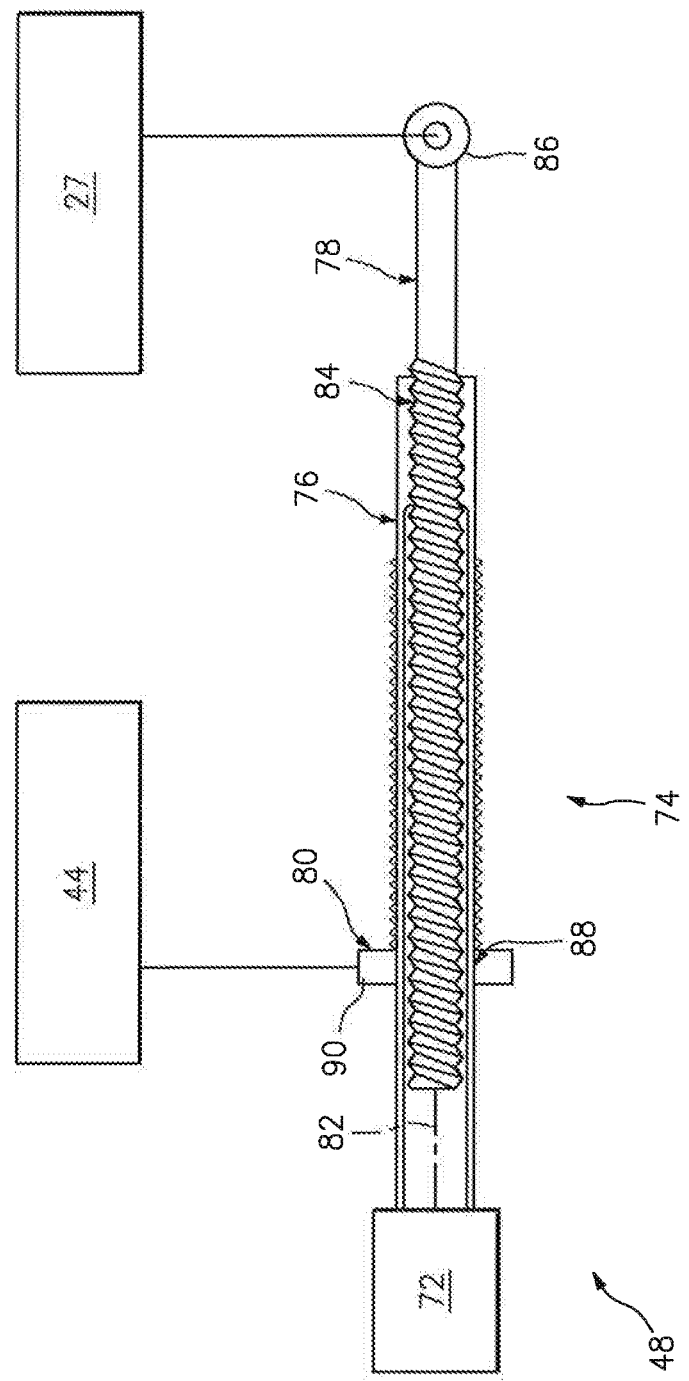
FIG. 5 is a diagrammatic illustration of an actuator mechanism for translating the translating cascade and the translating sleeve, where the cascade and the sleeve are shown in block diagram form.
Figure 6:
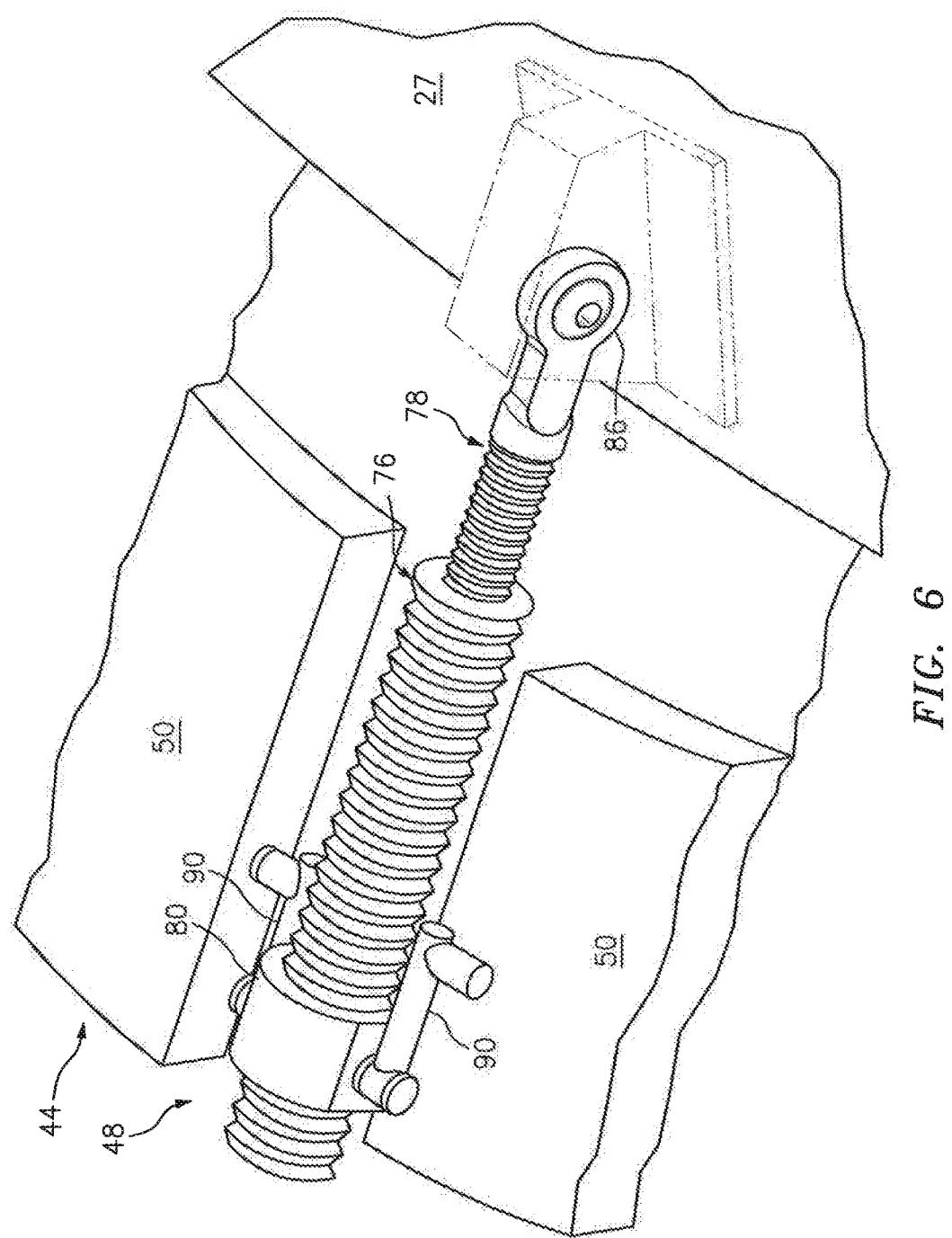
FIG. 6 is a perspective illustration of the actuator mechanism for translating the translating cascade and the translating sleeve, Where portions of the cascade and the sleeve are shown as transparent.

FIG. 5 illustrates an exemplary embodiment of one of the actuator mechanisms 48; see also FIG. 6. This actuator mechanism 48 includes an actuator 72 and a drive mechanism 74. The actuator 72 may be configured as an electric motor, a hydraulic actuator, a pneumatic actuator, or any other type of actuation device.

The drive mechanism 74 is configured to translate the translating cascade 44 between its stowed portion (see FIG. 3) and its deployed position (see FIG. 4) at a first rate. The drive mechanism 74 is further configured to translate the translating sleeve 27 between its stowed portion (see FIG. 3) and its deployed position (see FIG. 4) at a second rate. This first rate may be faster or slower than the second rate depending upon the specific desired configuration and operability of the thrust reverser system 16, However, in the exemplary embodiment of FIG. 5, the first rate is faster than the second rate.

The drive mechanism 74 of FIG. 5 (see also FIG. 6) is configured as a lead screw mechanism; e.g., a dual lead screw mechanism. This drive mechanism 74 includes a lead screw sleeve 76, a lead screw shaft 78 and a shuttle nut 80.

In general, the lead screw sleeve 76 couples the actuator 72 to the lead screw shaft 78 and the shuttle nut 80. The lead screw shaft 78 then couples the lead screw sleeve 76 to the translating sleeve 27, independent of the shuttle nut 80. The shuttle nut 80 couples the lead screw sleeve 76 to the translating cascade 44, independent of the lead screw shaft 78. The lead screw shaft 78 and the shuttle nut 80 may thereby form independent axial drive components respectively for the translating sleeve 27 and the translating cascade 44.

More particularly, the lead screw sleeve 76 is rotatably connected to an output of the actuator 72 such that the actuator 72 may rotate the lead screw sleeve 76 about an axis 82. The lead screw shaft 78 projects into a bore of the lead screw sleeve 76. An outer threaded portion of the lead screw shaft 78 is mated with an inner threaded portion of the lead screw sleeve 76 at a threaded interface 84. A mounting portion 86 of the lead screw shaft. 78 is attached to and rotationally fixed by the translating sleeve 27. The lead screw sleeve 76 projects through a bore of the shuttle nut 80. An outer threaded portion of the lead screw sleeve 76 is mated with an inner threaded portion of the shuttle nut 80 at a threaded interface 88, which has a finer pitch than the threaded interface 84. A mounting portion 90 of the shuttle nut 80 is attached to and rotationally fixed by the translating cascade 44.

As described above, the lead screw shaft 78 is rotationally fixed by the translating sleeve 27 and the shuttle nut 80 is rotationally fixed by the translating cascade 44. By rotationally fixing these components 78 and 80, the threaded interfaces 84 and 88 are operable to translate rotational movement of the lead screw sleeve 76 into axial movement of the components 78 and 80. These components 78 and 80 are therefore operable to respectively axially drive the translating sleeve 27 and the translating cascade 44 along the centerline 18 during first and second modes of operation.

During the first (e.g., deployment) mode of operation, the actuator 72 rotates the lead screw sleeve 76 in a first rotational direction about the axis 82. The threaded interface 84 translates this rotational movement of the lead screw sleeve 76 into axial movement of the lead screw shaft 78 and, thus, the translating sleeve 27 in the aft direction at the first rate. The threaded interface 88 similarly translates the rotational movement of the lead screw sleeve 76 into axial movement of the shuttle nut 80 and, thus, the translating cascade 44 in the aft direction at the second rate. Since the first rate is faster than the second rate, the translating sleeve 27 may have a longer axial stroke (e.g., axial displacement) than the translating cascade 44.

During the second (e.g., stowing) mode of operation, the actuator 72 rotates the lead screw sleeve 76 in a second rotational direction about the axis 82, which is opposite the first rotational direction. The threaded interface 84 translates this rotational movement of the lead screw sleeve 76 into axial movement of the lead screw shaft 78 and, thus, the translating sleeve 27 in the forward direction at the first rate. The threaded interface 88 similarly translates the rotational movement of the lead screw sleeve 76 into axial movement of the shuttle nut 80 and, thus, the translating cascade 44 in the forward direction at the second rate.

Figure 7:
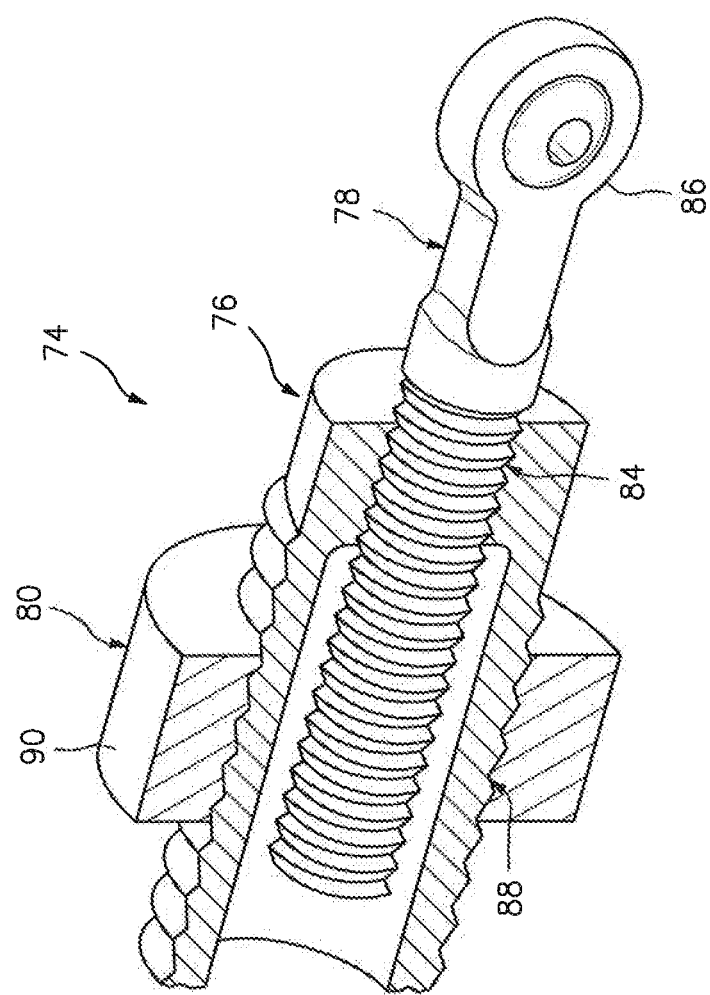
FIG. 7 is a diagrammatic illustration of a portion of another actuator mechanism.

In some embodiments, referring to FIG. 7, the threaded interface 88 may have a coarser pitch than the threaded interface 84. The actuator 72 therefore will drive the lead screw shaft 78 at a slow rate than the shuttle nut 80. In such embodiments, the lead screw shaft 78 may also have a shorter axial stroke than the shuttle nut 80. In this manner, the foregoing pitches may be independently varied and thereby independently tailor the actuation rate of the elements 78 and 80.

In some embodiments, the lead screw shaft 78 may be attached to the translating cascade 44. In turn, the shuttle nut 80 may be attached to the translating sleeve 27.

The thrust reverser system 16 may be configured to translate one or more components other than the translating sleeve 27 and/or the translating cascade 44. Examples of such other components include, but are not limited to, a structure that translates and/or deploys Mocker doors, or a structure featuring air flow diverters, or a structure that axially translates the fan nozzle section of the aft end of the thrust reverser. In such alternative embodiments, the thrust reverser system 16 may translate its first translating component substantially (e.g., generally only) along the centerline 18; e.g., not move the first translating component radially and/or not pivotally. The thrust reverser system 16 may also or alternatively translate its second translating component substantially (e.g., generally only) along the centerline 18; e.g., not move the second translating component radially and/or not pivotally. However, the present disclosure is not limited to the foregoing exemplary substantially axial translation of the first and/or second components.

The propulsion system 10 of the present disclosure may include various turbine engines other than the one described above. The propulsion system 10, for example, may include a geared turbine engine where a gear train connects one or more shafts to one or more rotors in a fan section, a compressor section and/or any other engine section. Alternatively, the propulsion system 10 may include a turbine engine configured without a gear train. The propulsion system 10 may include a geared or non-geared turbine engine configured with a single spool, with two spools, or with more than two spools. The turbine engine may be configured as a turbofan engine, a turbojet engine, a pusher fan engine or any other type of ducted turbine engine. The present disclosure therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. A thrust reverser system with an axial centerline, comprising:
   a first translating element comprising a translating cascade;
   a second translating element comprising a translating sleeve; and
   an actuator mechanism attached to the first translating element and the second translating element, the actuator mechanism configured to translate the first translating element substantially along the axial centerline at a first rate, the actuator mechanism configured to translate the second translating element substantially along the axial centerline at a second rate that is different than the first rate, and the actuator mechanism including a lead screw sleeve, a lead screw shaft and a shuttle nut;
   the lead screw shaft within the lead screw sleeve and mated with the lead screw sleeve by a first threaded interface, and the lead screw shaft connected to the translating sleeve;
   the shuttle nut including an annular base a plurality of mounting arms;
   the annular base circumscribing the lead screw sleeve and mated with the lead screw sleeve by a second threaded interface; and
   the plurality of mounting arms arranged on opposing sides of the annular base, and the plurality of mounting arms connected to the annular base and the translating cascade;
   wherein a first connection point between a first of the plurality of mounting arms and the annular base is separated from a second connection point between the first of the plurality of mounting arms and the translating cascade by an axial distance.

2. The thrust reverser system of claim 1, wherein the first rate is faster than the second rate.

3. The thrust reverser system of claim 1, wherein the first threaded interface has a coarser pitch than the second threaded interface.

4. The thrust reverser system of claim 1, wherein the first threaded interface has a finer pitch than the second threaded interface.

5. The thrust reverser system of claim 1, wherein the actuator mechanism is configured to translate the translating sleeve between a stowed position and a deployed position, the translating sleeve covers an axial portion of the translating cascade in the stowed position, and the translating sleeve at least partially uncovers the axial portion of the translating cascade in the deployed position.

6. The thrust reverser system of claim 1, further comprising:
   a fixed structure;
   wherein the actuator mechanism is mounted to the fixed structure and is configured to translate the translating cascade between a stowed position and a deployed position; and
   wherein the fixed structure covers an axial portion of the translating cascade in the stowed position, and the fixed structure at least partially uncovers the axial portion of the translating cascade in the deployed position.

7. The thrust reverser system of claim 1, wherein
   the actuator mechanism includes a drive mechanism and an actuator configured to actuate the drive mechanism;
   the drive mechanism includes the lead screw sleeve, the lead screw shaft and the shuttle nut; and
   the lead screw sleeve couples the actuator with the lead screw shaft and the shuttle nut.

8. A thrust reverser system with an axial centerline, comprising:
   a fixed structure;
   a first translating element comprising a translating cascade;
   a second translating element comprising a translating sleeve; and
   an actuator mechanism mounted to the fixed structure and including a first drive component and a second drive component, the first drive component mounted to the first translating element independent of the second translating element, and the second drive component mounted to the second translating element independent of the first translating element, and the actuator mechanism including a lead screw sleeve, a lead screw shaft and a shuttle nut, wherein the actuator mechanism is configured to axially translate the first translating element and the second translating element;
   the lead screw shaft configured as the second drive component, the lead screw shaft within the lead screw sleeve and mated with the lead screw sleeve by a first threaded interface, and the lead screw shaft connected to the translating sleeve;
   the shuttle nut configured as the first drive component, the shuttle nut including an annular base and a mounting portion;
   the annular base circumscribing the lead screw sleeve and mated with the lead screw sleeve by a second threaded interface; and
   the mounting portion extending axially along the lead screw sleeve between a first end and a second end, the mounting portion connected to the annular base at the first end, and the mounting portion connected to the translating cascade at the second end, wherein the mounting portion does not engage the lead screw shaft.

9. The thrust reverser system of claim 8, wherein the actuator mechanism is configured to translate the first translating element along the axial centerline at a first rate, and the actuator mechanism is configured to translate the second translating element along the axial centerline at a second rate that is different than the first rate.

* * * * *